Dec. 14, 1926.

J. R. LITTY 1,610,691

RECEPTACLE FILLING MACHINE

Filed Sept. 21, 1925

8 Sheets-Sheet 1

Fig. 1.

WITNESSES

INVENTOR
John R. Litty
BY
HIS ATTORNEY

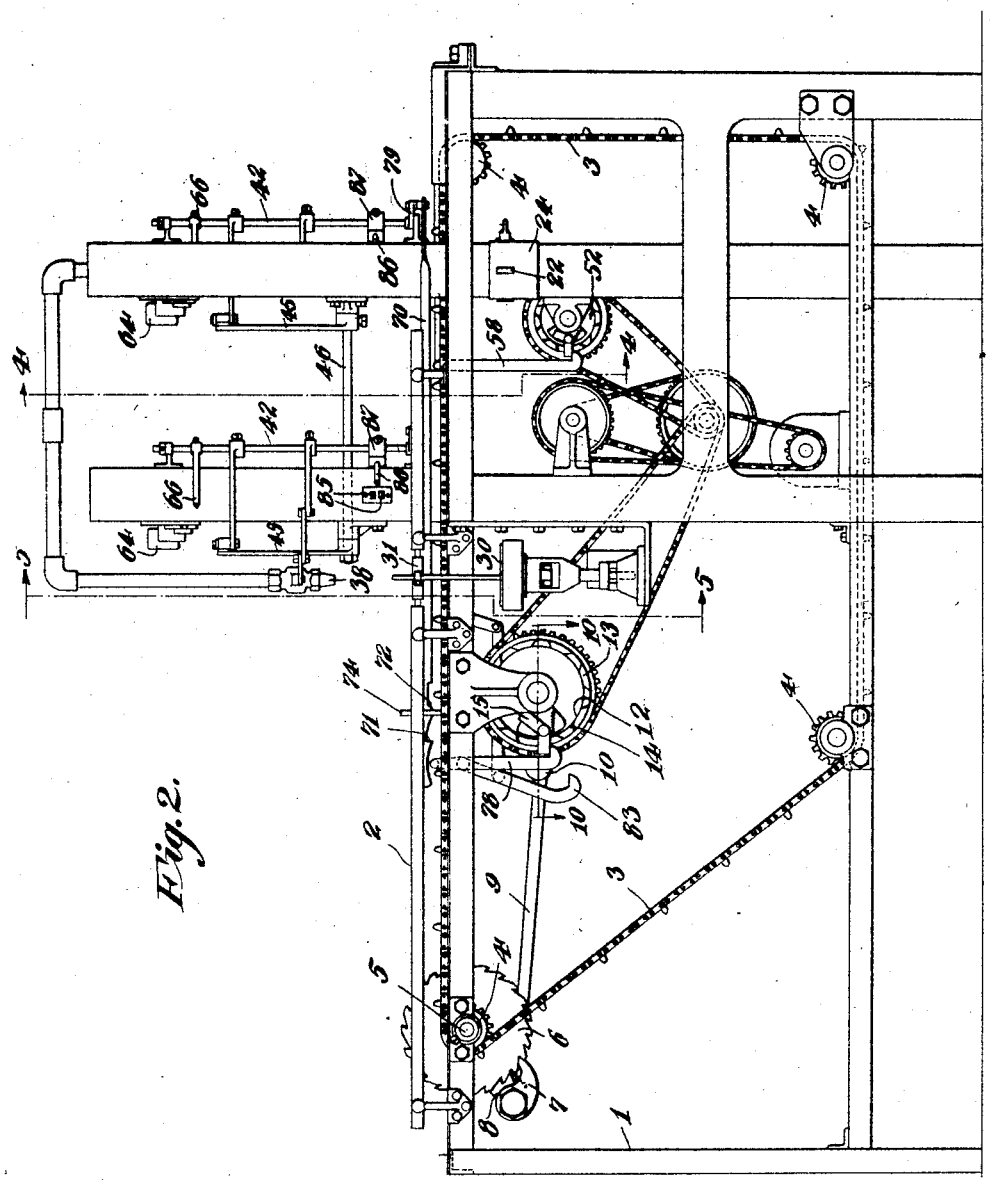

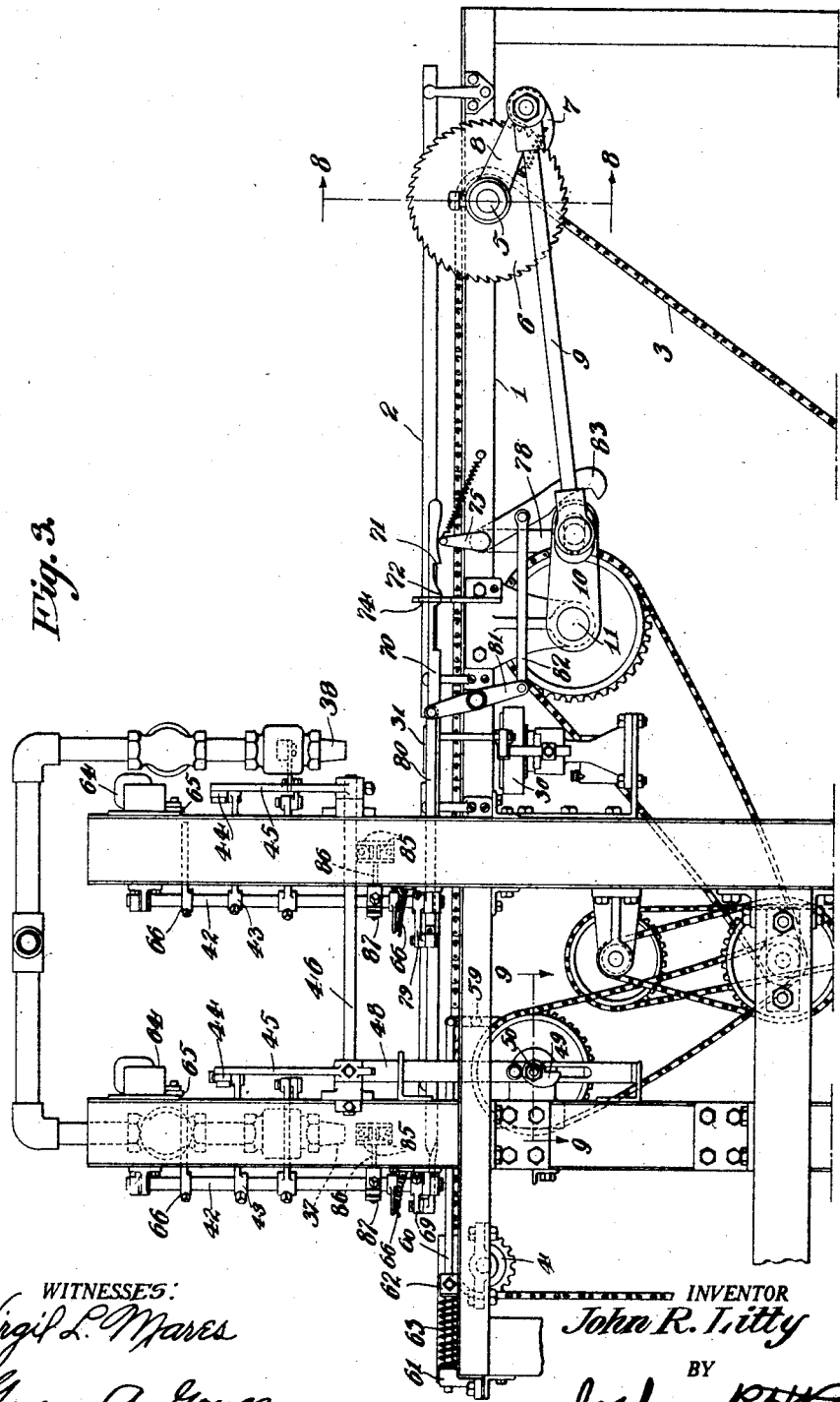

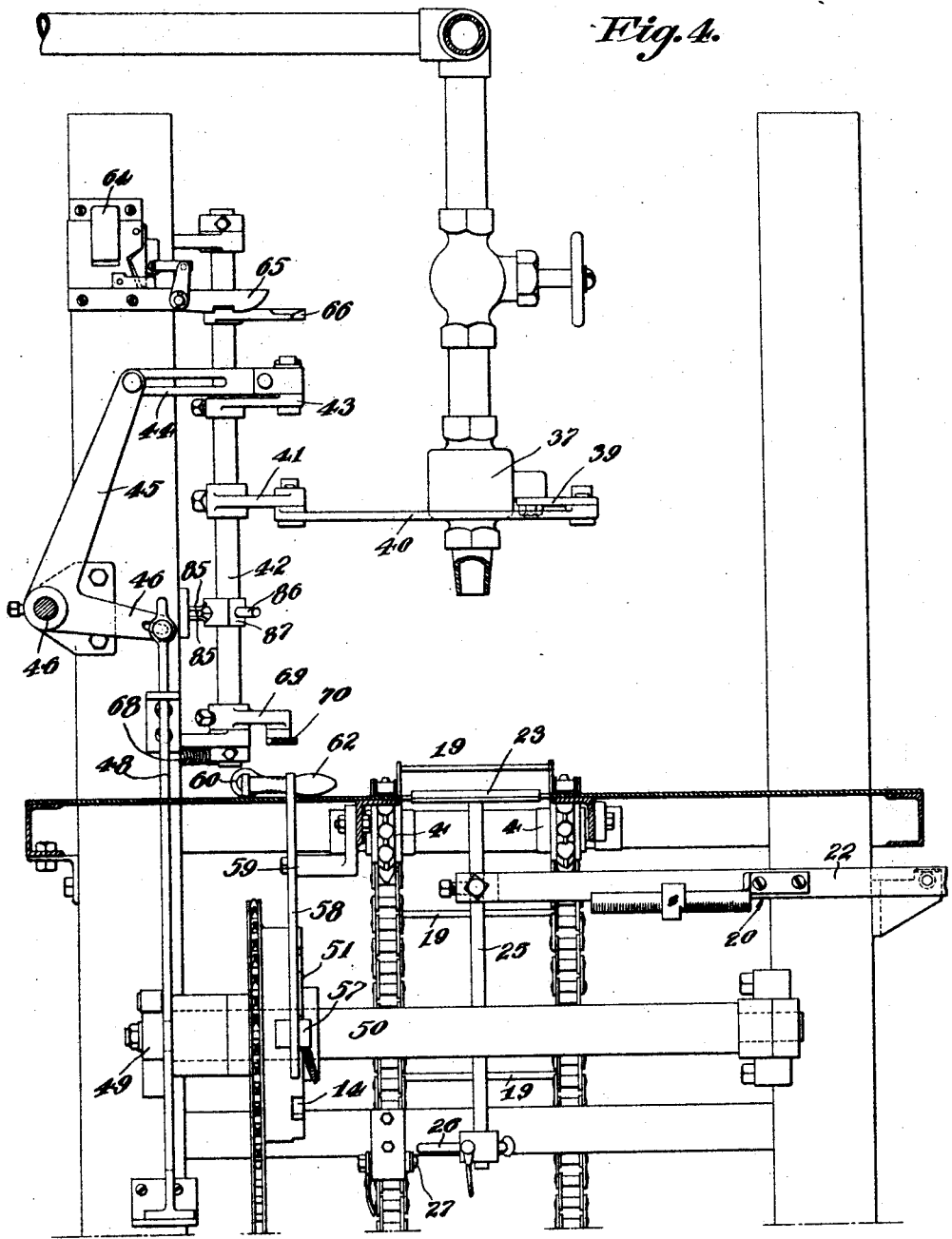

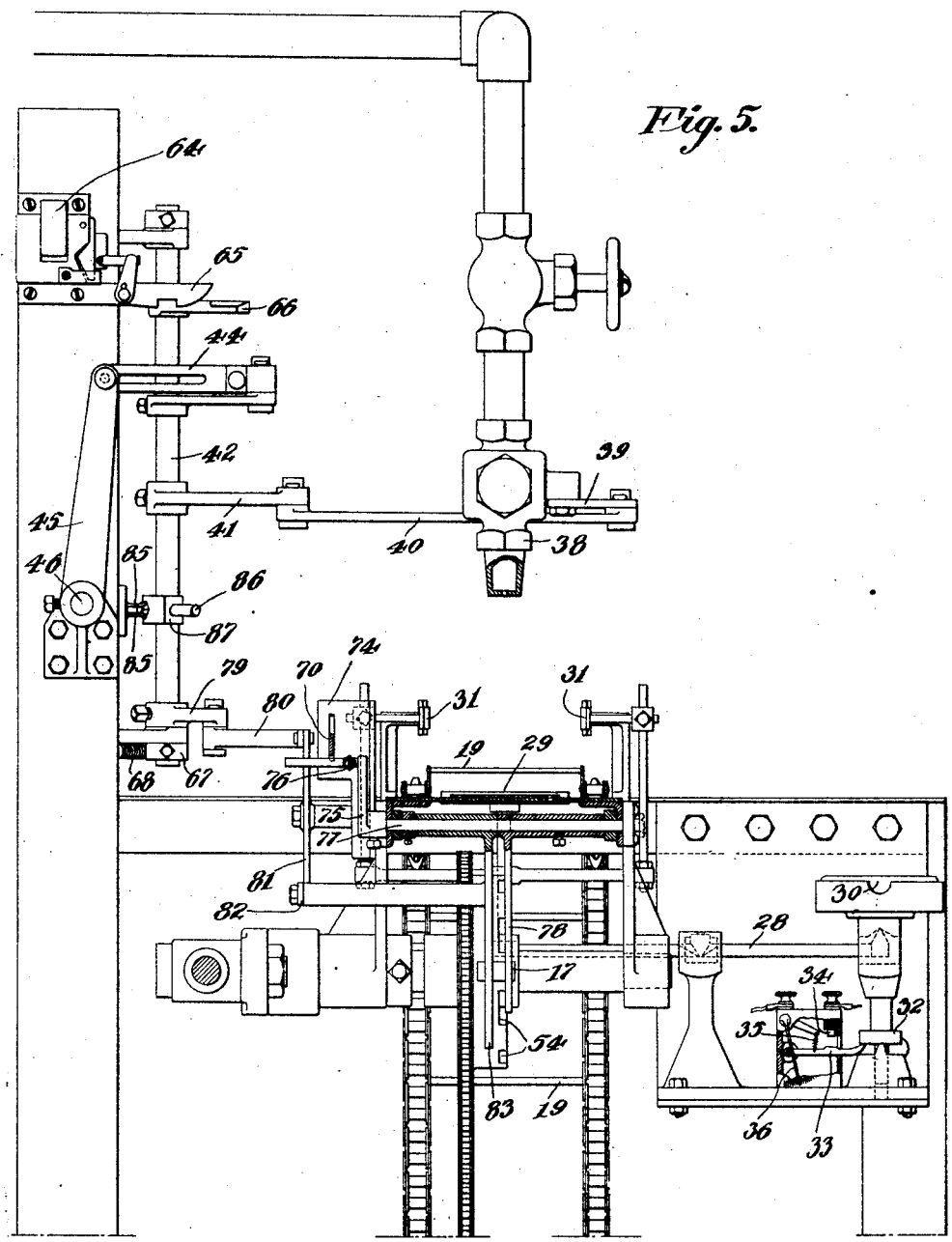

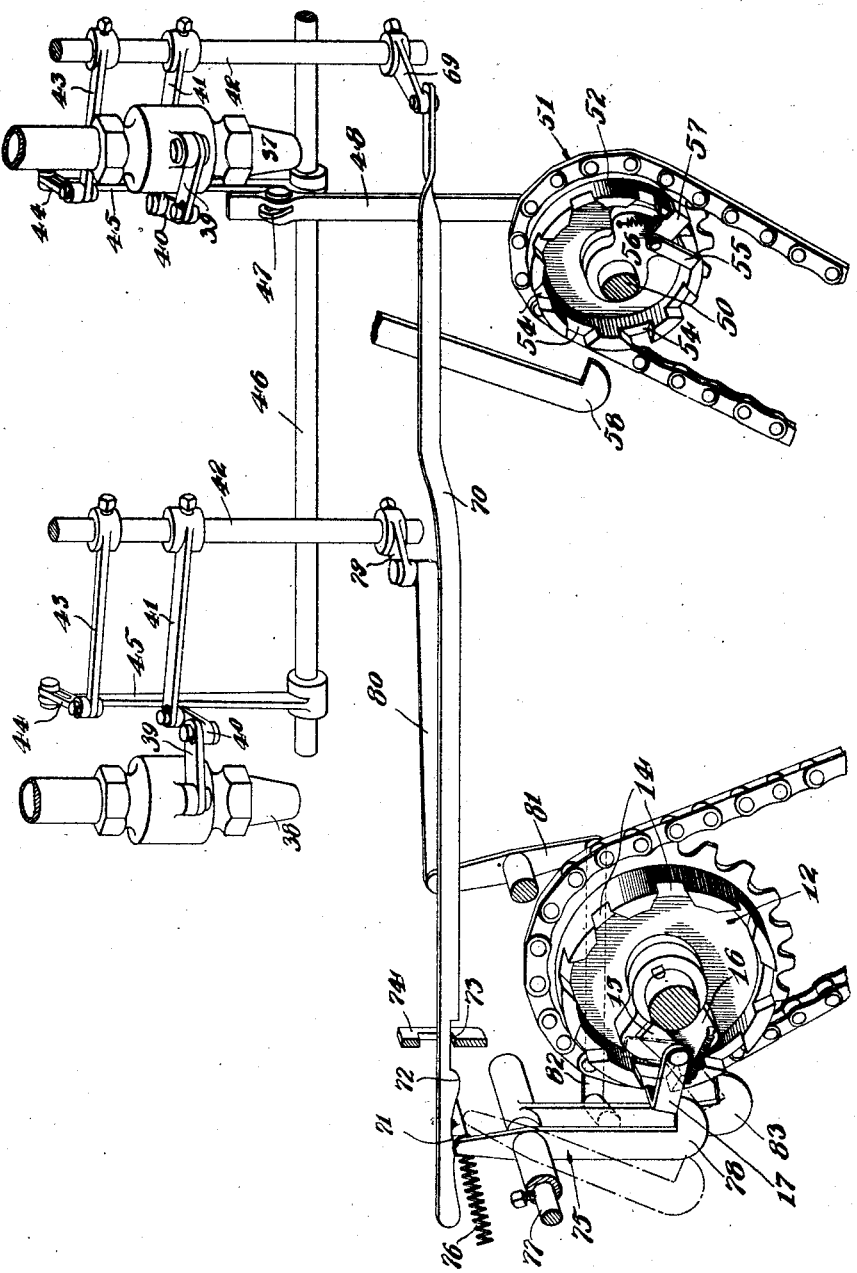

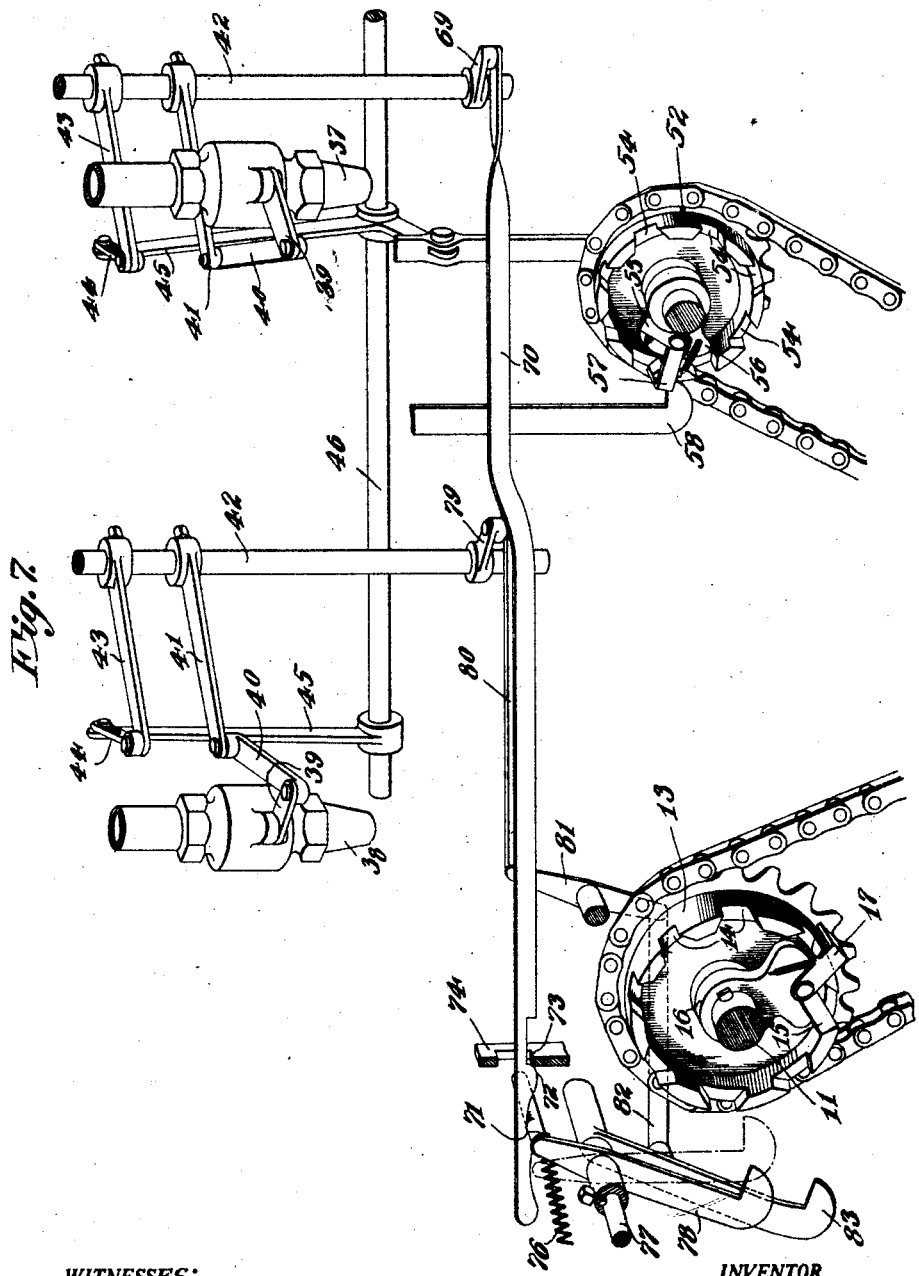

Dec. 14, 1926.
J. R. LITTY
1,610,691
RECEPTACLE FILLING MACHINE
Filed Sept. 21, 1925   8 Sheets-Sheet 8
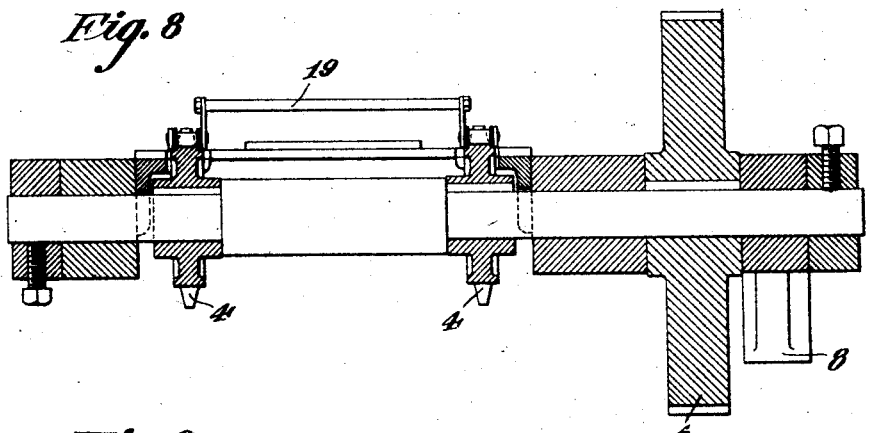
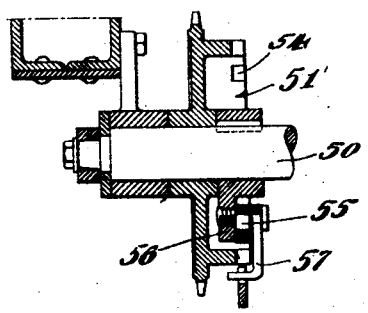
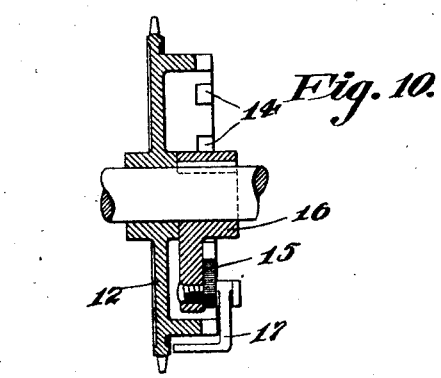
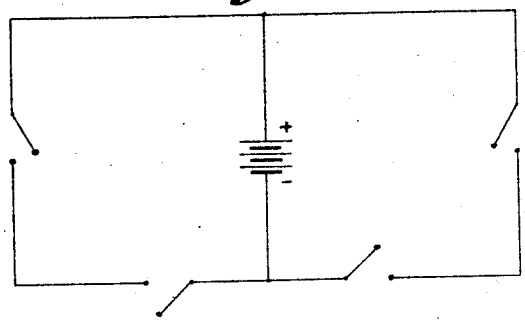

Patented Dec. 14, 1926.

1,610,691

UNITED STATES PATENT OFFICE.

JOHN R. LITTY, OF PHILADELPHIA, PENNSYLVANIA.

RECEPTACLE-FILLING MACHINE.

Application filed September 21, 1925. Serial No. 57,519.

My invention relates to machines for filling receptacles with liquid, plastic or granular material.

The usual method of filling such receptacles is by hand. This method is slow and makes the packing costly. Various methods have been produced to reduce this costly step, but have proved unsatisfactory because they did not fill the receptacle with quantities of predetermined weight and were unsanitary.

The objects of my invention are to provide a machine which will accurately fill receptacles with weighed quantities.

These objects, and other advantageous ends which will be described hereinafter, I attain in the following manner, reference being had to the accompanying drawings in which—

Figure 1 is a plan view of a machine constructed in accordance with my invention, Figure 2 a front view of the machine shown in Figure 1, Figure 3 a rear view of the machine shown in Figure 1, Figure 4 an enlarged fragmentary section on line 4—4 of Figure 2, Figure 5 an enlarged fragmentary section on line 5—5 of Figure 2, Figure 6 a skeleton perspective view of elements connected in accordance with my invention, Figure 7 a view similar to Figure 6 illustrating the parts in another position, Figure 8 an enlarged section on line 8—8 of Figure 3, Figure 9 an enlarged section on line 9—9 of Figure 3, Figure 10 an enlarged fragmentary section on line 10—10 of Figure 2, and Figure 11 a diagram of the electrical connections in the machine shown in Figure 1.

The machine has two scales, a main scale and a checking scale. The main scale is balanced when the receptacle thereon has received the correct or approximately correct weight of material from a main valve, and thereby effects, thru electrical and mechanical means, the closing of the valve. The checking scale is more sensitive than the main scale and is balanced by a more accurate amount of material than would balance the main scale, and effects the closing of the checking valve, thru electrical and mechanical means, when the weight in the receptacle has been brought up to the correct weight. The receptacles are moved off and on the scales by a conveyor which moves intermittently and is automatically started by mechanism actuated by the closing movement of both the main and checking valves, and stopped by the same mechanism which automatically sets itself to effect the stopping. I have shown the main and checking valves as being of the type suitable for use with plastic or liquid material but other valves may be substituted which are suitable for use with granular material.

Referring to the drawings, 1 indicates a frame having a receptacle guideway 2, 3 a conveyor passing in the guideway and over sets of sprockets 4. One set of sprockets is mounted on a drive shaft 5 rotatable in the frame and having keyed thereto a ratchet wheel 6. A pawl 7, adapted to engage and move the ratchet wheel intermittently, is pivoted on an arm 8 swingably mounted on the end of shaft 5. This arm is connected by a link 9 with a crank 10 on a clutch shaft 11. A clutch 12 is mounted on shaft 11 and consists of a rotatably mounted driving member 13 in the form of a ratchet wheel, notched at 14 to engage a spring-held dog 15 on a driven member 16 fixed to shaft 11. The dog is moved out of notches 14 by an L-shaped extension 17 which is adapted to engage and be actuated by hooks, to be described later, to swing the dog out of the notches. The conveyor chain has bars 19 which move receptacles, in guideway 2, on and off the platforms of a main scale 20 and a checking scale 21.

The main scale consists of a yoke-shaped balance beam 22 having a platform 23 at one end and a balance weight 24 at the other end. The platform is adjustably mounted on the beam by a stem 25. A contacting finger 26, carried by the lower end of stem 25, is adapted to engage a contact 27 when the beam is balanced by a receptacle having the correct, or nearly correct, weight of material therein. When the circuit is completed, by finger 26 and contact 27, mechanism is actuated to close the valve from which the material is being discharged.

The checking scale consists of a balance beam 28 having a platform 29 mounted at one end and a balance weight 30 at the other end. The platform carries sectional receptacle guides 31 to avoid the friction that would exist between the receptacle and a stationary guide when the receptacle moved downward with the scale platform. Balance weight 30 carries an abutment 32 which engages a pivoted contacting arm 33 adapted to engage a contact 34. This arm is swung against contact 34 by a delicate spring 35 whose tension may be varied by an arm 36 so that its effect on the accuracy of the checking scale is negligible. Finger 33 and contact 34 complete a circuit through electrical means which cause the valve, discharging material into a receptacle on the check weight scale, to close.

The receptacles receive their material from a main valve 37 and a checking valve 38. Valve 37 and the mechanism connected therewith fills the receptacle with the major weight of material while valve 38 and the more delicate mechanism connected therewith discharges a slight amount of material to bring up the weight to the correct weight. The nozzle of valve 37 is of practically the same area as the passage in the valve, while the nozzle of valve 38 has a fine pin-hole passage so that the inertia effect of the discharged material, on the checking scale, will be negligible. These valves are opened by a system of links and levers connected with a common cam. The linkage for each valve being similar but one will be described.

It consists of a valve lever 39 connected by a link 40 with a lever 41 on a vertical shaft 42 which has another lever 43, connected by a slotted link 44 with a vertically swingable lever 45 on a shaft 46. This shaft actuates the link and levers of each system and has a slotted lever 47 connected with a vertically movable cam follower 48 which co-acts with a cam 49 to receive vertical movement. Cam 49 is mounted on a shaft 50 having a clutch 51, similar to clutch 12, mounted thereon. This clutch consists of a driving member 52 in the form of a sprocket, notched at 54 to engage a spring-held dog 55 pivotally mounted on a driven member 56 keyed to shaft 50. The dog is normally in the notches and is swung out of the notches by an extension 57 adapted to engage and be moved by a hook 58 pivoted on the frame at 59 and having its upper end connected to a rod 60 slidable in a guide 61. Movement of a handle 62 will slide rod 60 against the action of a spring 63 to actuate hook 58 for connecting clutch 51 and thereby effecting the opening of both valves. When the main scale and checking scale are balanced by the receptacles on their platforms which have received material from the main and the checking valves, they will complete a circuit between the finger 26 and contact 27 on the main scale and finger 33 and contact 34 on the checking scale, to actuate mechanisms for closing the valves. These valve closing mechanisms being similar but one will be described.

A solenoid 64 is connected with a latch 65 which is adapted to engage an arm 66 on vertical shaft 42. An arm 67 at the lower end of the shaft is connected with a spring 68 on the frame. When arm 66 is caught and held by latch 65 the valve is fully open and spring 68 is under tension. When solenoid 64 actuates the latch 65 to release arm 66, spring 68 will return the parts to their former position and close the valve. After the receptacles on the scales receive their proper weight of material they effect the closing of the valves and cause the conveyor chain to move the receptacles off the scales by mechanism now to be described.

The mechanism connected with the main valve consists of a lever 69 connected with a bar 70 having at its free end a shoulder 71 and a cam face 72 which is adapted to engage the lower edge 73 of a guide 74. Shoulder 71 is adapted to engage, move and release an extension of a lever 75 against the action of a spring 76. This lever is fixed to a shaft 77 which carries a fixed hook 78. A closing movement of main valve 37 and the parts connected therewith will swing hook 78. The mechanism for the check weight valve consists of a lever 79 connected by a link 80 with a lever 81 pivoted on the frame and connected by a link 82 with a hook 83 pivoted on the shaft 77. A closing movement of checking valve 38 and its associated parts will swing hook 83. Hooks 78 and 83 are adapted to be swung into and out of the path of the moving extension 17 of clutch 12 to connect and disconnect the same and thereby actuate conveyor chain 2 to move filled receptacles from the scales and other receptacles onto the scales.

To render the circuit between each scale and its solenoid inoperative except when the valves are open, I provide a pair of contacts 85 in the circuit which are adapted to be connected by a copper bar 86 fixed by an insulating block 87 to vertical shaft 42. Bar 86 completes a circuit between contacts 85 only when the valve is fully open.

The operation of the machine is as follows:—

Assuming that the motor is running and there are receptacles, previously filled by the main valve, in the receptacle guideway, as shown in dot-and-dash lines at 88 in Figure 1, to be checked for their weight by the checking scale; a receptacle is placed on platform 23 of the main scale to be filled by the main valve. Handle 62 is then moved against spring 63 to swing hook 58 from under extension 57 as shown in Figure 7, to the position shown in Figure 6, to allow the spring actuated dog 55 to be swung into one of the notches 54 and connect the driving with the driven member of clutch 51. This will rotate shaft 50 and cam 49 and cause follower 48 to operate the linkage 39—47 of each valve to open the same. It is to be understood that a receptacle on the main scale and a previously filled receptacle on the checking scale receive material from these valves at the same time. When the weight of the material, discharged from the main valve into the receptacle on the main scale, balances the scale, it brings finger 26 into engagement with contact 27 to complete a circuit through solenoid 64 and cause latch 65 to release lever 66 and allow spring 68 to return the linkage of the main valve to its former position and thereby close the main valve. During the closing movement of the main valve hook 78 is moved from under the extension 17 of the clutch, as shown in Figure 7, by shoulder 71, bar 70 and lever 75. This releases extension 17 and allows the spring-actuated dog 15 to engage one of the notches and connect the clutch. As bar 70 passes through guide 74, its cam face 72 slides on edge 73 and raises the bar to bring shoulder 71 above the extension of lever 75 to release the same. Spring 76 being placed under tension by this movement will return lever 75 and hook 78 to their former position as shown in Figure 6. If the checking valve is still discharging material into the receptacle on the checking scale to compensate for the low weight, clutch 12 will be again disengaged by hook 83 which is in the path of the extension 17 in a manner similar to the disengagement caused by hook 78. If the checking valve is closed before the main valve, as it usually is, hook 83 will be swung to the position shown in full lines in Figure 7 and will be out of the way of extension 17. This allows the clutch 12 which was connected by hook 78, to continue rotating and move crank 10 and the mechanism connected therewith to actuate conveyor 3, and shift the filled receptacles off the scales and other receptacles on the scales. When the other receptacles have reached the scales, clutch 12 has rotated one revolution. This brings the extension 17 into engagement with hook 78 which causes the clutch to be disconnected and the conveyor stopped. Another receptacle is then placed on the main scale to be filled by the main valve and the cycle of operation is repeated.

It will be seen that with the machine above set forth receptacles may be filled with quantities of material of the correct weight.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a machine of the character described, valves; means for successively conveying each of a series of receptacles from one valve to another; mechanism operatively connected for opening the valves to discharge material into the receptacles; mechanism operatively connected for closing the valves when the receptacles have received a predetermined weight, and means connected with the last said mechanism for causing the conveying means to move the receptacles when all the valves are closed.

2. In a machine of the character described, means for conveying receptacles; main mechanism for filling a receptacle with material of less weight than the predetermined weight; checking mechanism for discharging material into the receptacle to increase its weight up to the predetermined weight, and means connected with said main and checking mechanism for causing the conveying means to move the receptacle from the main to the checking mechanism when it has received the predetermined weight.

3. In a machine of the character described, a main scale; a checking scale; a main valve for discharging material into a receptacle on the main scale; a checking valve for discharging material into a receptacle on the checking scale; mechanism for opening both of the valves; mechanism connected with the main scale and the main valve for closing the same when the scale is balanced by the partly filled receptacle, mechanism connected with the checking scale and the checking valve for closing the same when the scale is balanced by the filled receptacle thereon and means controlled by both of said valve closing mechanisms for moving the receptacles.

4. In a machine of the character described, a main scale; a checking scale; means for conveying receptacles onto the scales; a main valve for discharging material into a receptacle on the main scale; a checking valve for discharging material into a partly filled receptacle on the checking scale; mechanism for opening the valves; mechanisms connected with the valves and the scales for closing the valves when the scales are balanced by the receptacles thereon, and means operatively connected with the valve closing mechanisms for causing the conveying means to move the receptacles from the main scale to the checking scale when the valves are closed.

5. In a machine of the character described, a main scale; a checking scale; a main valve for discharging material into a receptacle on the main scale; a checking valve for discharging material into a partly filled receptacle on the checking scale; mechanism for opening the valves; mechanism connected with the main scale and the main valve for closing the same when the scale is balanced by the partly filled receptacle; mechanism connected with the checking scale and the checking valve for closing the same when the scale is balanced by the filled receptacle thereon, and conveying mechanism operatively connected with the valves for moving the receptacles from the main scale to the checking scale when the valves are closed.

6. In a machine of the character described, a main scale; a checking scale; a valve for discharging material into a receptacle on the main scale; a valve for discharging material into a partly filled receptacle on the checking scale; driving means; a clutch operatively connected with the driving means; valve opening mechanism connecting the clutch with both valves; means for operating the clutch to open the valves; mechanism connected with the scales and the valves for closing the valves when the scales are balanced by the receptacles thereon.

7. In a machine of the character described, a main scale; a checking scale; a main valve for discharging material into a receptacle on the main scale; a checking valve for discharging material into a partly filled receptacle on the checking scale; driving means; a clutch operatively connected with the driving means; a shaft operatively connected with the clutch; mechanism connecting the shaft with the main valve for opening the same; mechanism connecting the shaft with the checking valve for opening the same; mechanism for connecting the clutch to open the valves and for disconnecting the clutch when the valves are opened, and mechanism connected with the scales and the valves for closing the same when the scales are balanced by the receptacles thereon.

8. In a machine of the character described, a main scale; a checking scale; a valve for discharging material into a receptacle on the main scale; a valve for discharging material into a partly filled receptacle on the checking scale; mechanism for opening the valve; mechanisms including electrical means connected with the scales and the valves for closing the same when the scales are balanced by the receptacles, and conveying mechanism operatively connected with the valves for moving the receptacles from the main scale to the checking scale when the valves are closed.

9. In a machine of the character described, a main scale; a checking scale; a valve for discharging material into a receptacle on the main scale; a valve for discharging material into a partly filled receptacle on the checking scale; a switch connected with each scale and adapted to be closed when the scale is balanced; a solenoid for each switch; a latch actuated by each solenoid; mechanism for opening the valves and adapted to co-act with the latches to hold the valves open; resilient means for returning each mechanism to close its valve when released by the latch, and conveying means operatively connected with the valves for moving the receptacles from the main scale to the checking scale when the valves are closed.

10. In a machine of the character described, a main scale and a checking scale; a main valve for discharging material into a receptacle on the main scale; a checking valve for discharging material into a partly filled receptacle on the checking scale, the outlet passage on the checking valve being smaller than the outlet passage on the main valve, mechanism connected with the scales and the valves for closing the same when the scales are balanced by the receptacles and means controlled by the closing of the said valves for moving the receptacles from the main scale to the checking scale.

11. In a machine of the character described, mechanism for discharging into a receptacle material of less weight than the predetermined weight; mechanism for discharging material into a partly filled receptacle to increase its weight up to the predetermined weight; conveying means for moving the receptacle from the first mentioned mechanism to the second mentioned mechanism, and means controlled by the two discharge mechanisms for effecting a movement of the conveying means when the mechanisms cease to discharge material into the receptacle.

12. In a machine of the character described, mechanism for discharging into a receptacle material of less weight than the predetermined weight; mechanism for discharging material into a partly filled receptacle to increase its weight up to the predetermined weight; conveying means for moving the receptacle from the first mentioned mechanism to the second mentioned mechanism; a clutch operatively connected with the conveying means, and mechanism connected with both discharging mechanisms for effecting the connection of the clutch to move the conveying means and a disconnection of the clutch to stop the conveying means in a predetermined position.

13. In a machine of the character described, mechanism for discharging into a receptacle material of less weight than the predetermined weight; mechanism for discharging material into a partly filled receptacle to increase its weight up to the predetermined weight; conveying means for moving the receptacle from the first mentioned mechanism to the second mentioned mechanism; a clutch operatively connected with the conveying means; a pair of clutch connecting and disconnecting members; means connecting one member with the second mentioned mechanism whereby it is thrown into an inoperative position to allow connection of the clutch when said second main mechanism ceases to discharge material, and means connecting the other member with the first mentioned mechanism whereby said member will be momentarily thrown into inoperative position to allow connection of the clutch and then released and returned to its former position to effect a disconnection of the clutch.

14. In a machine for accurately filling receptacles, a series of measuring devices; means for conveying in succession each of a series of receptacles to each of said devices, means for measuring and discharging a certain quantity of material to each of said receptacles at the first of said devices, means for successively conveying each of said receptacles from said first device to another of said devices, means at said other device for augmenting the quantity of material to a predetermined amount, and means operatively connected with said other device for causing said conveying means to advance the series of receptacles only upon the cessation of operation of all the measuring devices.

In testimony whereof I have signed my name to this specification.

JOHN R. LITTY.